Sept. 1, 1953 R. A. HEISING 2,650,956

AMPLIFIER UTILIZING DEFLECTION OF AN ELECTRON BEAM

Filed Dec. 24, 1946 4 Sheets-Sheet 1

INVENTOR
R. A. HEISING
BY E. V. Griggs
ATTORNEY

Sept. 1, 1953 R. A. HEISING 2,650,956

AMPLIFIER UTILIZING DEFLECTION OF AN ELECTRON BEAM

Filed Dec. 24, 1946 4 Sheets-Sheet 2

INVENTOR
R. A. HEISING
BY E. V. Griggs
ATTORNEY

INVENTOR
R. A. HEISING
BY E. V. Griggs
ATTORNEY

AMPLIFIER UTILIZING DEFLECTION OF AN ELECTRON BEAM

Filed Dec. 24, 1946 4 Sheets-Sheet 4

INVENTOR
R. A. HEISING
BY E. V. Griggs
ATTORNEY

Patented Sept. 1, 1953

2,650,956

UNITED STATES PATENT OFFICE 2,650,956

AMPLIFIER UTILIZING DEFLECTION OF AN ELECTRON BEAM

Raymond A. Heising, Summit, N. J., assignor to Bell Telephone Laboratories, Incorporated, New York, N. Y., a corporation of New York Application December 24, 1946, Serial No. 718,185

23 Claims. (Cl. 179—171)

This invention relates to the art of generating and amplifying high frequency electric waves, particularly waves of such high frequency that they cannot be effectively handled by the conventional types of thermionic amplifying tubes.

A broad object of the invention is to provide apparatus for generating and amplifying very high frequency electric waves.

An important object is to provide apparatus for amplifying broader frequency bands than heretofore.

Another object is to provide apparatus for operating at very high frequencies that may be operated at more widely spaced carrier frequencies than can the conventional type of velocity variation tube.

A further object is to provide apparatus of the electron beam type that will give less noise from irregularities in the electron beam than obtains in the velocity variation type of tube.

Most electron beam amplifying tubes used for very high frequency electric waves utilize highly resonant circuits to provide a voltage step-up for operating upon the electron beam, and also for the power anode or power extracting circuit. Such circuits limit the transmission band of the tube markedly and restrict the frequency range over which the carrier frequency may be adjusted. Also the resonant input circuit in such tubes accentuates noise originating in irregularities in the electron beam by the production of transient waves in such circuit by said irregularities, which transient waves thereupon velocity vary succeeding parts of the beam causing an increase in noise.

The present invention avoids the aforementioned difficulties by avoiding the use of resonant circuits, and by using an input circuit that produces lateral displacement modulation instead of velocity modulation thus allowing of little or no resultant energy transfer between the input circuit and the electron beam.

In this invention, an electron beam is subjected to an electromagnetic field applied transversely thereto by traveling waves traversing conductors parallel to the beam. The electrons in the beam are laterally deflected at various points along the beam's length depending upon the phase of the traveling wave at the moment said electrons enter the field, and in accordance with the magnitude of said wave. The electrons in the deflected parts of the beam are caused to deliver high frequency power to a load circuit by directly impinging upon electrodes placed beside the beam path and connected to the load circuit, or by passing near a succession of turns or parts of a bent conductor which is so proportioned that induced impulses in the succession of turns or parts accentuate each other and add up into a wave of the frequency to be generated.

The theory of operation of my invention and various forms of apparatus in which it can be employed will be explained in detail with reference to the following drawings where:

Figure 1:
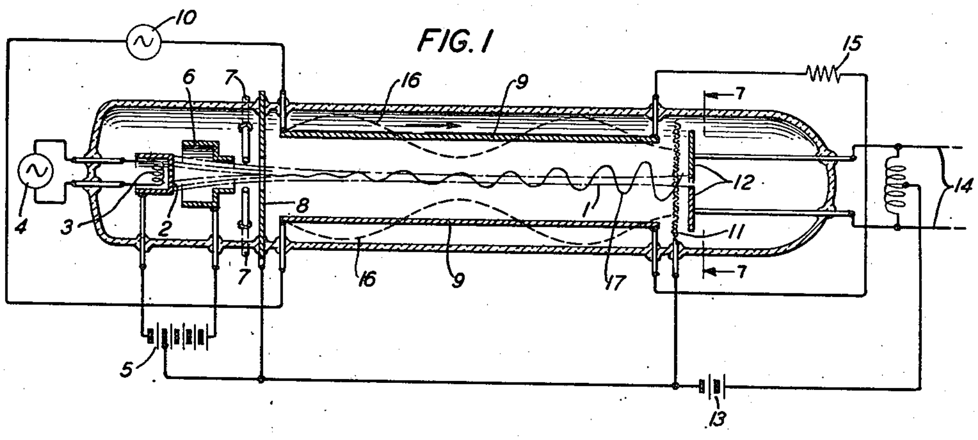
Fig. 1 is a schematic diagram of a tube embodying the invention.

Returning to Fig. 1, 1 indicates an electron beam or stream produced from electrons emitted by cathode 2 which is heated by heater 3 with electric power from source 4. The electrons are accelerated by a high potential from direct current source 5 due to its connection to electrode 6. The beam after passing controlling deflectors 7, 7 which are described later, passes through an opening in disc-shaped conducting electrode 8 which is at a lower potential than 6, and passes between input electrodes 9, 9 energized by a wave to be amplified from a source 10, thence through grid or shield 11 at the same potential as 8, and impinges on flat conducting electrodes 12, 12 at a higher potential than 11 due to source 13, and delivers energy to transmission line 14. The input circuit consists of two parallel wires 9, plates, or other shaped electrodes disposed on opposite sides of the electron beam and preferably as near to the beam as possible, and they may be parallel to the beam and equidistant from its normal position at all points. In length they should be, as a minimum, equal to the distance an electron in the stream moves in one cycle of the frequency to be amplified but much greater length is preferred. The input electrodes, with one pair of ends connected to source 10, have the other pair of ends connected to a suitable terminating circuit such as resistance 15 to absorb the energy and prevent any reflection. A traveling wave 16 occurs thereby upon the input wires moving from left to right. This traveling wave, though traveling at approximately the free space velocity of electromagnetic waves and many times faster than the electrons in the electron beam, will cause certain electrons to be displaced toward the upper electrode, and others displaced toward the lower electrode so that the beam takes the wavy path for which 17 represents the position of its center line. The electron beam will thus be splayed in various amounts on electrodes 12, 12 alternately depending upon the amplitude of the input wave 16 and will produce a high frequency wave in conductors 14. The displacing action is explained in the discussion of Figs. 2, 3 and 4.

Figure 2:
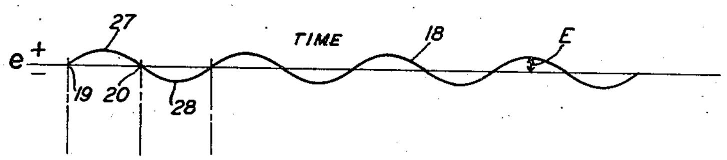
Figs. 2, 3 and 4 are diagrams to explain the displacement modulation.
Figure 3:
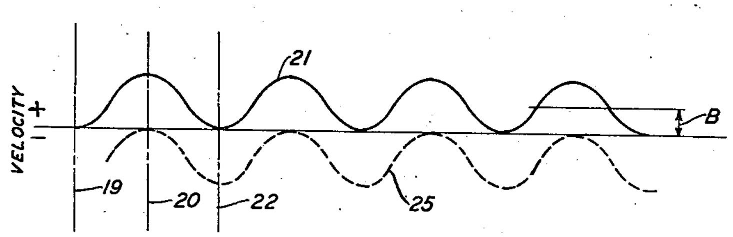
Figure 4:
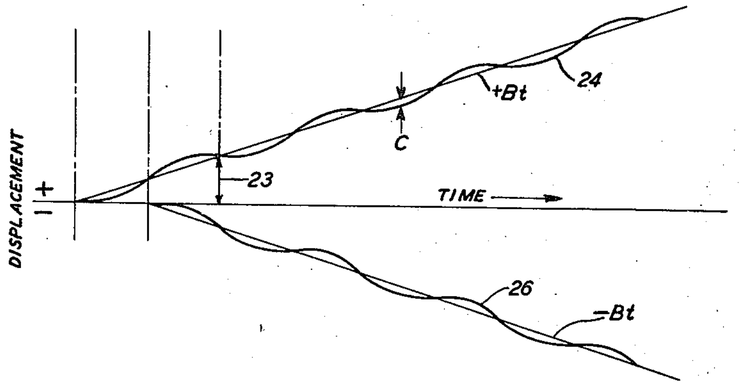

Fig. 2 represents by curve 18 the alternating field at an arbitrary stationary point along the beam 1 due to the wave on electrodes 9, 9. Time is the horizontal coordinate. A misconception occurs many places in electronic literature that an electron under the influence of an alternating electric field alone merely moves back and forth over the same path. Actually, an electron seldom does this, but drifts in one or the other direction in such a field. Imagine, therefore, an electron being released at the selected arbitrary stationary point in the field represented by Fig. 1 at time 19 with no initial velocities in any direction whatever. It will be subject to a positive field for a half cycle, until time 20, giving it upward velocity. This velocity is represented in Fig. 3 by that part of curve 21 falling between the time lines 19 and 20. At time 20 the field becomes zero and the velocity a maximum. For the half cycle following time 20, the electron will be subject to a negative field which in general will be equal in magnitude and duration to the positive field just experienced. The energy delivered to the electron by the positive half cycle will now be returned to the wave producing the field and the electron will be brought to rest at time 22. Fig. 4 represents the displacement of the electron in the positive direction during this complete cycle showing a displacement upward by an amount represented by 23 and with no velocity remaining. Each succeeding cycle will repeat the same process stepping the electron upward away from its initial position as represented by curve 24.

Mathematically the action is $$e=E\sin\omega t \qquad (1)$$

for the field, giving rise to the velocity equation $$v=B\ (1-\cos\omega t) \qquad (2)$$

where $B=E/\omega 1$ and to the displacement equation $$d=Bt-C\sin\omega t \qquad (3)$$

where $C=E/\omega 2$.

For an electron that comes under the influence of the electric field at time 20, the same type of action holds beginning with the negative half cycle producing a velocity curve 25, negative at all times, and a displacement curve 26, also negative at all times. An electron entering at times 27 and 28 with time reckoned from the time of entry encounters the electric field $$e=\pm E\cos\omega t \qquad (4)$$

getting a velocity of $$V=\pm B\sin\omega t \qquad (5)$$

and a displacement of $$d=\pm D\ \text{A}1-\cos\omega t) \qquad (6)$$

suffers no permanent displacement, but electrons entering at all times other than 27 and 28 will suffer some permanent cyclic displacement with time between the rates B$t$ and —B$t$. At the end of each full cycle of the operating time after particles enter the field, such particles will have no velocity in the direction of the applied field even though they will have experienced both positive and negative electric fields. Any electron or charged particle entering an alternating field with some initial velocity will, at the end of each full cycle after entering, possess its original velocity and direction, but those entering at other than times 27 and 28 will have been displaced in one direction or another parallel with the electric field of the exciting wave.

With this picture of the movement of an electron under the influence of an alternating electric field, the operation of the tube in Fig. 1 should be clear. Each electron in the beam comes through the opening or openings in 8 and quickly enters the electric field caused by the traveling wave 16 on electrodes 9, 9. The direction of movement of the electrons upon entering is perpendicular to the electric field and this component of motion continues unchanged in that direction until the electrons pass out of the field through grid 11. The field from the impressed wave, will, however, cause electron movements of the type just described transverse to the electron beam depending upon the part of the cycle at which the electron entered the field. Electrons entering the electric field during the quarter cycles before and after time 19 will be caused to drift upward, discrete distances each cycle, while they continue their uniform motion parallel to their original direction of motion upon entering the field, and the amount of drift per cycle will be greatest for those entering exactly at time 19 and will be less for those entering at other times falling off to zero for those entering exactly one-fourth cycle before or after time 19. Electrons entering the electric field during the quarter cycles before and after time 20 will be caused to drift downward in a similar manner. This drift will be repeated each cycle so long as the electrons are in the electric field between 9, 9. It will cause the electron stream to become deformed in the plane of the electric field and take the wavy shape for which line 17 represents its center line. The effect of the deformation of the stream of electrons is to cause them to be sprayed or splayed alternately between electrodes 12, 12 which, by virtue of connection to line 14, deliver power at the frequency of source 10.

It is to be observed that an electron between electrodes 9, 9 in the field produced by wave 16 experiences a different frequency than that measured objectively at terminals of 10 because the electron is in motion parallel to the direction of motion of wave 16. The frequency experienced by the electrons will be termed the "effective frequency" to distinguish it from the applied frequency. It is expressed by the equation $$\text{Effective frequency}=\frac{V\mp v}{V}f$$

where $f$=frequency of source 10
$V$=velocity of wave 16 along 9, 9 which is approximately the velocity of light
$v$=velocity of the electrons in the stream and where the minus sign is used when the wave 16 travels in the same direction as the electrons in the stream, and the plus sign is used if they travel in opposite directions, which can be provided for by interchanging connections of source 10 and resistance 15 with their respective ends of electrodes 9, 9. A cycle of the effective frequency is likewise termed an "effective cycle," and all cycles involved in the interaction of electrons in the stream and wave 16 or electrodes 9, 9, in this disclosure and claims are to be considered "effective cycles" whether the adjective "effective" is used or not.

In this invention, variations in electron density in the electron stream produce little or no noise by virtue of reaction upon the input circuit. An irregularity in electron density in the beam, upon passing electrode 8 and entering between electrodes 9, 9 induces equivalent waves or potential changes in both electrodes 9,9 but such waves or potential changes do not react upon the electron stream and produce movements or displacements in the directions that convey wave amplification, because the latter requires a lateral movement or displacement produced by difference of potential between 9, 9. At the time such irregularities leave the field between 9, 9, such variations in electron density will have a greater effect upon one of electrodes 9 if it is in that part of the electron stream that has been displaced. The difference in the impulses induced in the two electrodes 9, 9 will alone have any effect. The induced effect will split, part going to terminating resistance 15 and be absorbed, and the rest traveling back along electrodes 9, 9 to generator 10. Its magnitude will depend not only upon its position in the deflected electron stream, but only upon the rapidity with which it leaves the field between electrodes 9, 9. In general, it has little effect as the proximity of electrode 11 distorts the field between 9, 9 so that the pulse is not sharp. In addition, such pulse traversing control electrodes 9, 9 once will give a very small displacement to an electron in the stream in comparison with what is produced by a succession of exciting waves from source 10 during the time the electron travels from electrode 8 to electrode 11. Any reaction may be further ameliorated, if desired, by increasing the space between electrode 11 and the contiguous ends of 9, 9.

Since the effective amplification of the tube is in general proportional to the amplitude of the beam swing, the amplification is increased by increasing the time the beam remains under the control of the electrodes 9, 9. This may be accomplished by increasing the tube length, or by slower beam velocity between 8 and 11, up to whatever limit is set by difficulties of beam focus, and natural spreading of the beam by mutual repulsion of the electrons. In Fig. 1, electrodes 8 and 11 are at reduced potential from electrode 6 so as to slow down the electrons in the beam and provide greater time for input action. The collecting electrodes have an increased potential given by source 13 to insure electron collection and to deliver power.

Since neither input nor output circuits are tuned, the usual restriction on band width produced by tuning is avoided. The amplification is not, however, entirely independent of frequency. Consideration of Figs. 2, 3 and 4 and of the evaluated constants B and C in connection with Equations 2 and 3 will show that the displacement per cycle varies inversely with the square of the frequency. However, each electron requires a definite time to travel from electrode 8 to electrode 11, so the number of cycles it will be influenced is proportional to the frequency. The deflections in the beam will thus vary inversely with frequency. For band widths customarily employed in radio communication, this variation is usually negligible.

Figure 5:
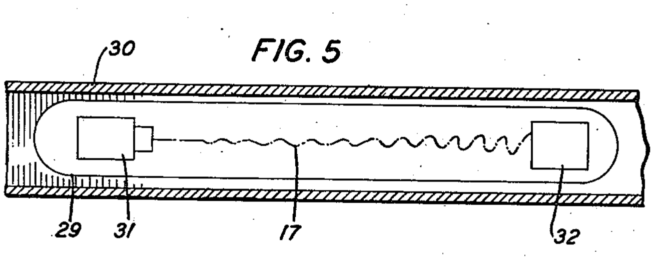
Fig. 5 illustrates a second embodiment using a wave guide type of input circuit.

In Fig. 5 tube 29 represents the tube of Fig. 1 associated with a wave guide 30 for input control instead of electrodes 9, 9 where 17 is the electron beam moving from electron gun 31 to an output circuit 32 and in which the exciting or control wave is passing through the wave guide in either direction and in which the electric field of the wave is transverse to the electron beam and in the direction deflection is desired. Box 32 represents elements 11, 12, 13 and 14 of Fig. 1, or any of the output ends of the tube represented in Figs. 8, 9, 10, 13 or 15. Standing waves in the wave guide or in Fig. 1 type of input electrodes are in general to be avoided as the presence of a node along 9, 9 or along the influencing part of Fig. 5 from a standing wave will reverse the lateral drift of electrons and defeat the purposes of the invention.

Figure 6:
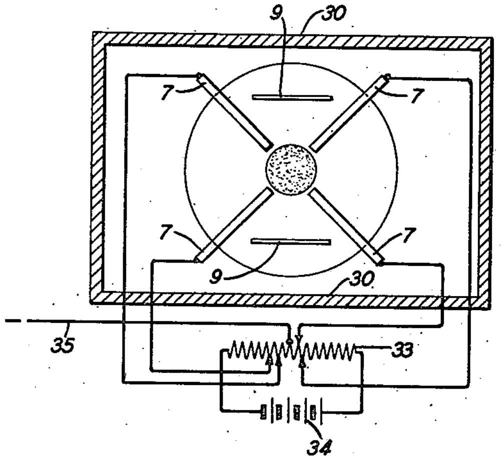
Fig. 6 is a diagram of a beam controller to simplify constructional difficulties.

Fig. 6 shows control electrodes 7, 7, 7, 7 mentioned in connection with Fig. 1 to simplify construction. By suitable potentials applied to these various control electrodes from a potentiometer 33 across a potential source 34, and connecting the mid-potential point to electrode 8 of Fig. 1 by means of conductor 35 in Fig. 6, the normal position of the electron beam may be placed where desired when inaccuracies in construction or other reasons make it desirable to be able to control its normal position.

Figure 7:
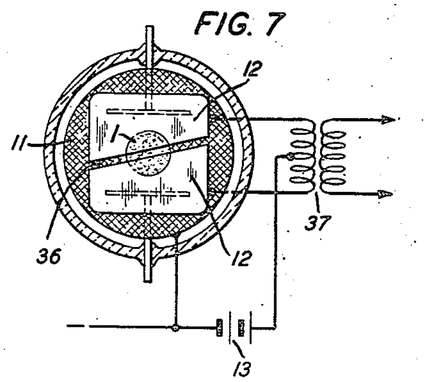
Figs. 7, 8, 9 and 10 are diagrams of various power electrode or power extracting circuits.

Fig. 7 is a view of the tube of Fig. 1 from the output end. The anodes 12, 12 are shown with a small space 36 between which may be horizontal, or at most, any angle up to about ±45 degrees from the horizontal. The electron beam 1 here is represented as large compared to the spacing between 12, 12. 12, 12 can overlap with greater spacing at the overlap point if lower capacity between is desired. A transformer 37 is represented in the local circuit but any suitable circuital connection such as the non-tuned line of Fig. 1 may be made to the anodes 12, 12.

Figure 8:
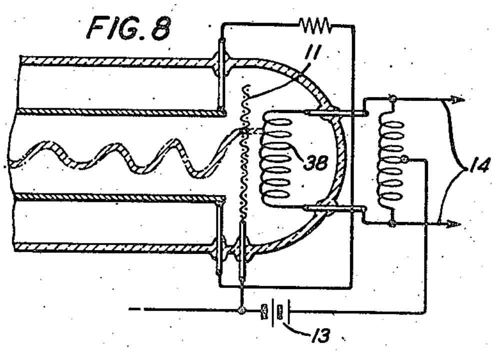

Fig. 8 shows another form of construction at the output end. An anode consisting of a closely wound conducting coil 38 is connected between the lines 14, 14. The electrons striking the turns of the coil will tend to divide, some going to one wire of 14, 14, and some to the other, but more will go to the nearest wire. The amplitude of the current delivered to the load circuit in this case will be proportional to the beam deflection up to the ends of the coil. In Fig. 7, proportionality is approximate only for deflections up to the radius of the electron beam.

Figure 9:
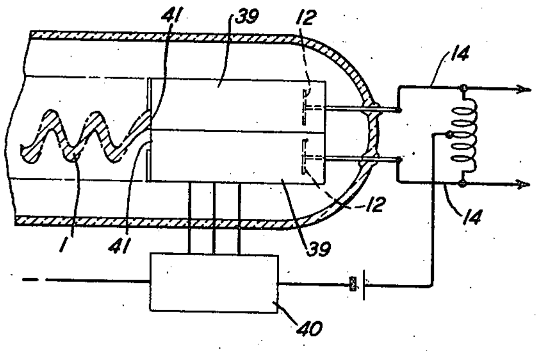

Fig. 9 shows the output end of a tube in which electron multipliers 39, 39 are employed, each electron multiplier admitting electrons from the splayed beam through its opening 41, and having its final anode connected to one wire of transmission line 14, 14. The electron multipliers should be of a type that use electric fields and electron inertias to function, and not embody magnetic fields as a magnetic field will have enough stray field to interfere with the proper movement of the electron in beam 1. Such an electron multiplier structure is described in Patent 2,200,722, issued to J. R. Pierce et al. The external power supply 40 supplies the numerous potentials to the numerous anodes and electrodes in the two electron multipliers. The electron beam 1 swinging across the two openings 41, 41 to the respective multipliers causes various numbers of electrons to enter, and the multipliers will deliver to their respective anodes 12, 12 proportionately greater numbers of electrons, which in turn will deliver greater amounts of high frequency power to line 14, 14.

Figure 10:
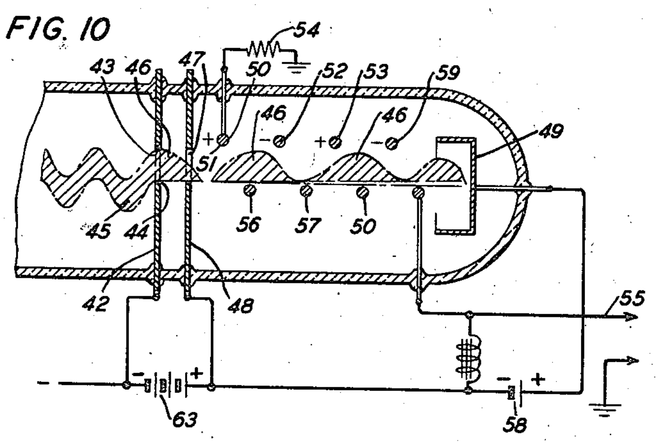

Fig. 10 shows a power electrode or power extracting circuit of a more efficient type. An electrode 42 similar to element 11 but made of sheet conducting material, has an opening 43 with one edge 44 so placed as to intercept from one-half to all the electron beam in its normal position. The splaying beam 45 then splays groups of electrons 46, 46, etc. through the opening where they pass through an opening 47 in a second similar electrode 48 maintained at higher potential than 42 by source 63, which increases their velocities and spacings, and they move forward until they strike electron catching anode 49. Between electrodes 48 and 49 energy is extracted by means of power electrode 50. Electrode 50 consists of a long conductor wound as a helix of square, circular, elliptical or other cross-section through which the groups of electrons pass axially, and having dimensions and position such that the groups of electrons can pass close to the conductor without striking it. In Fig. 10, the helix appears as cross-sections of wire designated 52, 53, 56, 57 and 59. Where the length of one turn is large compared to the circumference of the electron beam passing through opening 43, the helix is flattened as indicated by the end view in Fig. 11, where 50 is the helix flattened so that one diameter is reduced almost to the vertical dimension of opening 43 in electrode 42. The preferred direction of the shorter diameter is in the direction of the deflection of the electron beam, but it may be flattend in some other direction if desired. When the length of one turn is not large compared to the circumference of the electron beam, the helix reduces to a circle, and finally to a square or whatever other shape is given to opening 43, and just enough larger than opening 43 to allow the groups of electrons to pass through without striking conductor 50 in any appreciable quantity. The length of a turn is determined by the frequency of operation. If a still higher operating frequency is desired than allowed by a given area of opening 43, then both the helix area and the opening 43 must be reduced the necessary amounts. The electron beam may also be reduced in size to avoid losses due to a beam larger than opening 43, but this affects efficiency only, and is not necessary for successful operation. The helical winding 50 in one form is such that a wave of the normal operating frequency will spread along two complete turns. One-half wavelength will spread along one complete turn so that when a positive peak is at 51 in Fig. 10 a negative peak will be at 52, a positive at 53, etc. and a wave will be generated and enhanced by an electron group 46 as it moves along toward electrode 49. One end of helix 50 connects with a terminating resistance 54 to ground to prevent standing waves, while at the other end power is delivered by connection 55 to any suitable load such as a transmission line.

In the position shown in the diagram, an electric field between wires 51 and 52 extends downward into the electron group 46 beneath, so that the electron group, moving against this electric field delivers energy to the wave on said wires. The electrons nearest the wires deliver the most energy. By the time the electron group has moved half the distance between wires 51 and 52, the wave will have moved along the helix so that wires 56 and 57 are respectively + and — and 51 and 52 will be zero, and the electron group will deliver energy again, those electrons near the bottom of the group delivering the most energy. As the group moves farther the wave does likewise so that the energy is built up alternately on the top wires and the bottom wires. The energy delivered to the wires of the helix comes from the kinetic energy of the electrons in groups 46—46 as they continue their movement toward collecting anode 49. As they deliver energy, their velocities are reduced. Though the helix is represented as having only a few turns, more turns may be utilized and greater efficiency secured. If lengthened considerably the groups will be slowed down enough to necessitate closer spacing of turns toward anode 49.

The description of power electrode 50 just given is a preferred form as it lends itself to reaching the highest frequencies. It can be made, however, with closer spacings of turns if desired just so that a full wavelength of the generated wave along the wire spans enough turns to encompass the distance between equal phase points on successive groups of electrons, and so that the axial opening is large enough to pass the said electron groups. It can also be made with wider spacings than described, though difficulties will begin to appear as the spacings are increased.

By utilizing a power source 58 to make anode 49 suitably positive with respect to 50, secondaries from 49 can be prevented from striking 50.

The description so far envisages 50 as a single wire helix. If a two-wire electrode form for 50 is preferred, two wires are wound so as to appear in Fig. 10 in identical form as 50, but instead of the end view shown in Fig. 11, the end view will be that of Fig. 12. Two wires starting near positions 51 and 52, Fig. 10, have terminating resistance 54 connected between, bend around and pass through positions 56 and 57 at one-quarter wavelength along said wires, and then utilize three-quarters wavelength to swing out and come back at points 53 and 59 producing identical potential distributions in Fig. 10 and after making the desired number of turns on the helix come out as the pair of wires 60 in Fig. 12 for delivering power.

Figure 13:
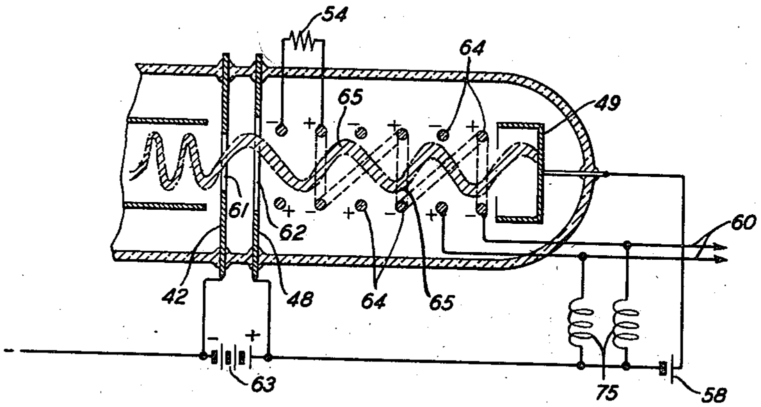
Fig. 13 is a diagram of another power electrode or power extracting circuit.

Fig. 13 shows still another form of electrode system for extracting high frequency energy from the splayed electron beam. In this form the entire beam is used, where in Fig. 10 one-half is discarded. Electrode 42 in the apparatus of Fig. 13 has an opening 61 large enough to pass the splayed beam at maximum amplitude. A second electrode 48 is raised to higher potential than the electrode 42 by a source 63 to spread out the waves in the beam along the axis of the tube, and to provide more available power and to permit easier construction of helix 64. A larger opening 62 is provided in electrode 48 than in electrode 42 so as to reduce the converging lens effect of the openings. Between electrode 48 and collector 49 is placed a helix 64, partially flattened having an inside diameter in the plane of the splayed beam that will accommodate said splayed beam. This helix is preferably constructed of a pair of wires, half wavelength to half a turn, and pitch of one turn per wavelength of splayed beam. The pitch is not uniform, as it will be zero for the first half turn from the end that connects to resistance 54, and the pitch distance for a full turn will then be concentrated in the second half turn. Fuller information is given below in connection with Fig. 14. The instantaneous potentials of the wires contiguous to the splayed beam will be as shown in Fig. 13 at the instant that the splayed beam has the form and position also shown there. The helix 64 is connected at one end through chokes 75, 75 to the positive side of potential source 63 so as to be at the same mean potential as electrode 48, and also connected by means of leads 60 to a load circuit. Potential source 58 may be inserted in the connecting lead between helix 64 and electron collector 49 to prevent secondary emission from the latter from returning to the helix 64.

Electrode 48 and potential source 63 may be omitted where the potential applied to electrode 42 from source 5 is adequate to give desired electron group velocities and spacings. The same is true of electrode 48 in Fig. 10.

With this power extracting electrode system, the extremities of the loops in the electron beam 65, 65, . . . will pass near certain wires of the helix and will generate pulses in them which will travel both ways in the helix. The pulses generated as the loops pass the wires on the two sides will all add up in such a relation as to deliver high frequency energy out of terminals 60. The energy which travels in the other direction will be absorbed at terminating resistance 54 which will avoid standing waves and any resonance effect.

Figure 14:
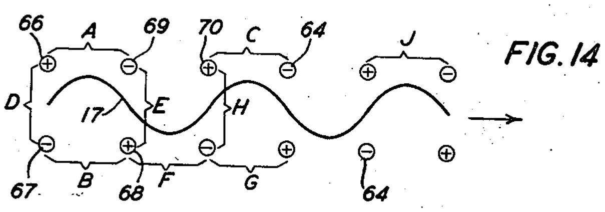
Fig. 14 is a diagram for explaining further details of Fig. 13.

The power extracting electrode system can be constructed in many other ways than that described above. Fig. 14 is a diagram to make clear various ways, and to outline principles so that one skilled in the art may make further arrangements. 17 represents the center line of the splayed electron beam at a certain moment as it moves to the right. The small circles, of which a few have been marked 64 represent the cross-section of wires of the power extracting circuit or electrode system in the plane of the splayed electron beam. The + and — signs within the circles represent the instantaneous potentials of the generated wave when the splayed beam 17 is in the position shown. The conductor comprising the power extracting electrode system may be helical in shape, or have any shape and dimensions that will result in the above-mentioned distribution of + and — potentials. If made of two wires, the prefererd form is a pair of wires starting at A, looped to come back at B one-half wavelength along the wires, then looped to C so that the full amount of the helical pitch per turn comes in the second half of the turn. Similarly during the next half wavelength along the wires, the conductors pass to the position G and during the next to J. In like manner, the conductors proceed through the length of the helices. The helices thus have oval-shaped contours as viewed in planes perpendicular to the axis of the undeflected electron beam. Another suitable conformation is had beginning with a pair of conductors at A, the conductors extending for a full wavelength to a position at F, another full wavelength to the position at C, etc. Such a helix will have an elliptical contour in the plane perpendicular to the direction of normal electron travel. However, the power extracting electrode system may be constructed in other than helical form. For example, a pair of conductors may start at D, loop horizontally to E one-half wavelength along the conductors and loop horizontally a second time to H, another half wavelength along the conductors so that the upper conductor 66 continues to 69, 70, etc. in an upper horizontal plane and the lower conductor 67 continues in a lower horizontal plane to 68, etc. Another alternative involves a single conductor starting at 66, passing as a half wavelength in a vertical plane loop to 67, then in a horizontal plane half wavelength loop to 68, vertically to 69, and horizontally to 70, etc. Numerous other winding conformations may be used. These conformations do not all yield identical effects. The first two mentioned yield the broadest band transmission. The others involve some discrimination in output with a change in frequency, though this is so small compared to that given by resonant circuits that it may be neglected in the present state of the art.

Figure 15:
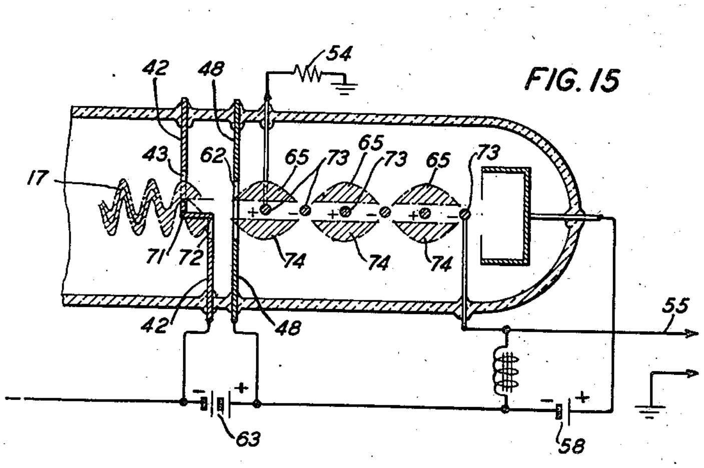
Fig. 15 shows still another power electrode or power extracting circuit.

Fig. 15 shows still another form of power extracting electrodes. Electrode 42 in this instance is made of flat conducting material, but has an offset 71 at or near a diameter that is perpendicular to the plane of the splayed beam as indicated by the cross-sectional view in Fig. 15. The parts above and below the offset are flat, and are approximately parallel. Above the offset is an opening 43 of a size and position to pass the electron beam when it is fully deflected upward, and below the offset is a second similar sized and positioned opening 72 that will pass the deflected beam when fully deflected downward. Electrode 48 with opening 62 is constructed as described in connection with Fig. 13, but if desired, the opening 62 may be reduced to be no larger than necessary to pass the beam fully splayed in both directions. It is maintained at a higher potential than electrode 42 by power source 63 to increase the velocity of and distance between groups of electrons 65 . . . 65 and 74 . . . 74. The purpose of the offset in electrode 42 is to delay having the downward deflected electrons come under the influence of the potential difference between electrodes 42 and 48 until sufficient time has elapsed so that the groups of downward deflected electrons through opening 72 will emerge from opening 62 as groups 74 . . . 74 in phase with the groups of upward deflected electrons coming through opening 43 and opening 62. The amount of the offset to be embodied in electrode 42 is dependent upon the frequency of the wave being amplified, the velocity of the electrons entering openings 43 and 72, the potential difference between electrode 48 and the electrode 42, and the distance between electrode 48 and the lower half of electrode 42, and can be computed by anyone skilled in the art using well known formulas for electron velocities as a function of potential that are found in all electronic reference and text books. In general, the amount of offset will exceed somewhat one-half the wavelength appearing in the center-line 17 of the splayed beam.

Delaying the passage of downward deflections of the beam through electrode 42 so that groups 74 . . . 74 emerge from opening 62 in phase with the upper deflection groups 65 . . . 65 allows of constructing power extracting electrode 73 . . . 73 as a single conductor that zig-zags in the horizontal plane of the axis of the undeflected electron beam. The electrode appears as cross-sections of wire 73 . . . 73 in Fig. 15. The crossings of the wire and of the electron beam center-line extended (at 73 . . . 73) are spaced one-half wavelength of the generated wave along the wire, and one-half the mean distance between successive groups of electrons 65 . . . 65 along the center-line extended. Electrons are prevented from striking the power extracting electrode 73 . . . 73 in any appreciable quantity by constructing the offset 71 so as to cast an electronic shadow that covers such electrodes 73 . . . 73. The groups of electrons, 65 . . . 65 above, and 74 . . . 74 below the electrode 73 . . . 73 induce pulses in conductors 73 . . . 73 as they pass, said pulses add up to a high frequency wave that delivers power at one end to a load or transmission line through lead 55. The component that moves in the opposite direction in the circuit of the conductor 73 . . . 73 is absorbed by terminating resistance 54 connected between the other end of conductor 73 . . . 73 and ground.

In Fig. 15, a power electrode consisting of a helix as described in connection with Fig. 10 but enlarged to encompass both upper and lower groups of electrons can be used if desired.

Figure 11:
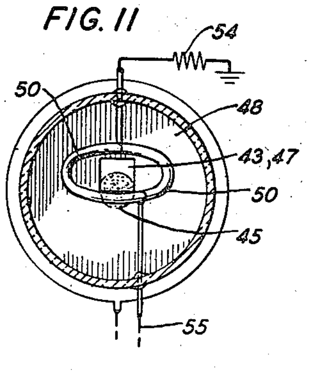
Figs. 11 and 12 are diagrams for explaining further details of Fig. 10.
Figure 12:
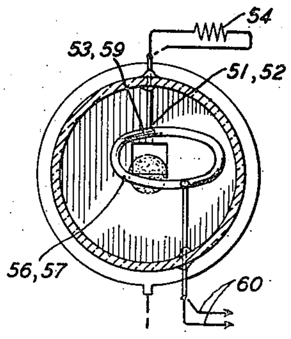

In the designs for the helical power electrodes in Figs. 10, 11 and 12, and the design for Figs. 13 and 14 termed ABCGJ, the axial velocity of the wave generated in said electrode is approximately the same as the velocity of the groups of electrons. For the DEH design of Fig. 14 and electrode 73 . . . 73 of Fig. 15, both of which have the wire or wires looped back and forth, the wave generated in said electrodes moves in the general direction of and with approximately the same velocity as the groups of electrons. The AFC design of Fig. 14 as applied to Fig. 13 has a relation of one-half between the axial direction velocity of the wave and the velocity of the electron groups, but because of the physical arrangement, the power is additive as groups of electrons pass various pairs of wires. Other conformations have more complex relations which more readily may be expressed in terms of timing of the passage of the groups and the phases of the waves than by velocity relations. The equal velocity designs have the broadest frequency characteristics.

All of the power electrodes may be made as long as desired, and may be modified in many other ways. The invention is, therefore, limited only as set forth in the appended claims.

What is claimed is:

1. In an electrical discharge device, means for producing a stream of electrons, means electrically coupled to said stream for variably deflecting it in response to electrical oscillations, and means for generating electrical oscillations from deflected electrons in said stream comprising means located along the path of the deflected electrons for segregating them into groups in combination with a helix of conducting material located along the path of deflected groups of electrons beyond said segregating means and disposed to permit said groups of electrons to pass axially therethrough.

2. In an electrical discharge device, means for producing a stream of electrons, means electrically coupled to said stream for variably deflecting it in response to electrical oscillations, means for generating electrical oscillations from deflected electrons in said stream comprising means located along the path of the deflected electrons for segregating them into groups, and means located along said path beyond said segregating means for increasing the distance between groups, in combination with a helix of conducting material located along the path of deflected groups of electrons beyond said segregating means and disposed to permit said groups of electrons to pass axially therethrough.

3. In an electrical discharge device, means for producing a stream of electrons, means electrically coupled to said stream for variably deflecting it in response to electrical oscillations, means for generating electrical oscillations from deflected electrons in said stream comprising means located along the path of the deflected electrons for segregating them into groups, in combination with an accelerating electrode spaced beyond said segregating means, along the path of groups of electrons and connected to a source of potential, and a helix of conducting material located beyond said accelerating electrode along the path of said groups of electrons and disposed to permit said groups of electrons to pass axially therethrough.

4. In an electrical discharge device, means for producing a stream of electrons, means electrically coupled to said stream for variably deflecting it in response to electrical oscillations, means for generating electrical oscillations from deflected electrons in said stream comprising a barrier electrode placed in the path of the stream with an opening therethrough and one edge of said opening arranged to permit electrons deflected in one lateral direction to pass, thereby converting part of the electron stream into successive groups of electrons, in combination with a second similar barrier electrode similarly placed but spaced further along the path of the electron stream and maintained at a higher potential than the first-named barrier, to increase the distance between successive groups of electrons, and a helix of conducting material located along the path of the groups of electrons passing said second-named barrier and disposed to permit said groups of electrons to pass axially therethrough.

5. In an electrical discharge device, means for producing a stream of electrons, means electrically coupled to said stream for variably deflecting it in response to electrical oscillations, and means for generating electrical oscillations from deflected electrons in said stream comprising means located along the path of the deflected electrons for segregating them into groups in combination with an electron energy extracting conductor which zig-zags beside the path of the groups of deflected electrons beyond said segregating means.

6. In an electrical discharge device, means for producing a stream of electrons, means electrically coupled to said stream for variably deflecting it in response to electrical oscillations, means for generating electrical oscillations from the deflected electrons in said stream comprising means located along the path of the deflected electrons for segregating the electrons deflected in one direction into groups, for segregating the electrons deflected in the opposite direction into groups and for providing a different accelerating field for the groups deflected in each of the two directions so that the groups of both directions of deflection will be in phase for the remainder of their travel, in combination with a conductor which zig-zags in between the paths of said differently deflected groups of electrons beyond said segregating and accelerating means for the purpose of extracting energy from said groups of electrons.

7. In an electrical discharge device, means for producing a stream of electrons, means electrically coupled to said stream for variably deflecting it in response to electrical oscillations, and means for generating electrical oscillations from the deflected electrons in said stream comprising means located along the path of the deflected electrons for segregating them into groups in combination with an electron energy extracting conductor located along the path of said groups of electrons beyond said segregating means and bent so as to repeatedly cross the center line of the undeflected electron stream extended, such crossings being in a direction approximately perpendicular to said center line and to the direction of deflection of said stream, and spaced along said center line extended by distance equal to the spacings of successive groups of electrons, and said crossings occurring along the conductor at distances spanned by odd numbers of one-half wavelengths of the generated wave of oscillations.

8. In an electrical discharge device, means for producing a stream of electrons, means electrically coupled to said stream for variably deflecting it in response to electrical oscillations, and means for generating electrical oscillations from the deflected electrons in said stream comprising means located along the path of the deflected electrons for segregating them into groups, in combination with a conductor located along the path of groups of deflected electrons beyond said segregating means and bent so as to repeatedly cross beside the path of said groups of electrons and to extract energy therefrom.

9. In an electrical discharge device, means for producing a stream of electrons, means electrically coupled to said stream for propagating an electromagnetic wave in a path adjacent to said stream whereby electrons in the stream are displaced in lateral direction, and means for generating electrical oscillations from the deflected electrons in said stream comprising means located in the path of the deflected electrons for segregating them into groups in combination with a helix of conducting material located along the path of groups of deflected electrons beyond said segregating means and disposed to permit said groups of electrons to pass axially therethrough.

10. In an electrical discharge device, means for producing a stream of electrons, means electrically coupled to said stream for propagating an electromagnetic wave in a path adjacent to said stream whereby electrons in the stream are displaced in lateral direction, means for generating electrical oscillations from the deflected electrons in said stream comprising means located beyond said stream displacing means along the path of the deflected electron stream for segregating the deflected electrons into groups, and means located beyond said segregating means along the path of groups of deflected electrons for increasing the distance between groups, in combination with a helix of conducting material located beyond said distance increasing means along said path of groups of electrons and disposed to permit said groups of electrons to pass axially therethrough.

11. In an electrical discharge device, means for producing a stream of electrons, means electrically coupled to said stream for propagating an electromagnetic wave in a path adjacent to said stream whereby electrons in the stream are displaced in lateral direction, means for generating electrical oscillations from the deflected electrons in said stream comprising means located beyond said stream displacing means along the path of the deflected electron stream for segregating the deflected electrons into groups, in combination with an accelerating electrode spaced from said segregating means along the path of the groups of electrons, a source of potential connected to said accelerating electrode, and a helix of conducting material located along the path of said groups of deflected electrons beyond said accelerating electrode and disposed to permit said groups of electrons to pass axially therethrough.

12. In an electrical discharge device, means for producing a stream of electrons, means electrically coupled to said stream for propagating an electromagnetic wave in a path adjacent to said stream whereby electrons in the stream are displaced in lateral direction, means for generating electrical oscillations from the deflected electrons in said stream comprising a barrier electrode placed in the path of the deflected electrons in the stream beyond said electron displacing means with an opening therethrough and one edge of said opening arranged to permit electrons deflected in one lateral direction to pass through said opening while electrons deflected in the opposite direction are prevented from so doing, thereby converting part of the electron stream into successive groups of electrons, in combination with a second similar barrier electrode similarly placed but spaced further along the path of said groups of electrons and maintained at a higher potential than the first-named barrier, to increase the distance between successive groups of electrons, and a helix of conducting material located along the path of said groups of electrons beyond said second barrier electrode and disposed to permit said groups of electrons to pass axially therethrough.

13. In an electrical discharge device, means for producing a stream of electrons, means electrically coupled to said stream for propagating an electromagnetic wave in a path adjacent to said stream whereby electrons in the stream are displaced in lateral direction, and means for generating electrical oscillations from the deflected electrons in said stream comprising means located along the path of the deflected electrons beyond said electron displacing means for segregating the deflected electrons into groups in combination with a conductor which zig-zags beside the path of the groups of deflected electrons beyond said segregating means for the purpose of extracting energy from said groups of electrons.

14. In an electrical discharge device, means for producing a stream of electrons, means electrically coupled to said stream for propagating an electromagnetic wave in a path adjacent to said stream whereby electrons in the stream are displaced in lateral direction, means for generating electrical oscillations from the deflected electrons in said stream comprising means located along the path of the deflected electrons beyond said electron displacing means for segregating the electrons deflected in one direction into a first series of groups, for segregating the electrons deflected in the opposite direction into a second series of groups and for accelerating the two series of groups at different points along the general direction of travel so that both groups of electrons will be in phase for the remainder of their travel, in combination with an electron energy extracting conductor which zig-zags in between the paths of said groups of electrons beyond said segregating and accelerating means.

15. In an electrical discharge device, means for producing a stream of electrons, means electrically coupled to said stream for propagating an electromagnetic wave in a path adjacent to said stream whereby electrons in the stream are displaced in lateral direction, means for generating electrical oscillations from the deflected electrons in said stream comprising means located along the path of the deflected electrons beyond said electron displacing means for segregating the deflected electrons into groups in combination with an electron energy extracting conductor located along the path of said groups of deflected electrons beyond said segregating means and bent so as to repeatedly cross the center line of the undeflected electron stream extended, such crossings being in a direction approximately perpendicular to said center line and to the direction of deflection of said stream, and spaced along said center line extended by distances equal to the spacings of successive groups of electrons, and said crossings occurring along the conductor at distances spanned by odd numbers of one-half wavelengths of the generated wave of oscillations.

16. In an electrical discharge device, means for producing a stream of electrons, means electrically coupled to said stream for propagating an electromagnetic wave in a path adjacent to said stream whereby electrons in the stream are displaced in lateral direction, and means for generating electrical oscillations from the deflected electrons in said stream comprising means located along the path of the deflected electrons beyond said electron displacing means for segregating the deflected electrons into groups, in combination with a conductor located along the path of said groups of deflected electrons beyond said segregating means and bent so as to repeatedly cross beside the path of said groups of electrons and to extract energy therefrom.

17. In combination, an electron gun, a source of potential connected thereto producing an electron stream, a source of very high frequency waves to be amplified, a pair of straight conductors disposed on opposite sides of said electron stream but parallel to it and forming a transmission line electrically coupled to said electron stream, a connection between the pair of ends of said transmission line nearer said electron gun and said source of high frequency waves, a terminating resistance connected to the other pair of ends of said transmission line, a helix of conducting material disposed in the path of the electron stream beyond said ends of transmission line nearer the electron gun, and a connection from the helix to a circuit for utilizing the amplified high frequency waves.

18. An electronic device comprising means for producing a stream of electrons along a path, means located along the path of said stream of electrons and electrically coupled thereto for impressing a high frequency electric field across said path in a generally perpendicular direction thereto and thereby deflecting said stream of electrons, means located along the path of the deflected stream of electrons beyond said deflecting means for segregating the deflected electrons in the stream into groups and means located along the path of said groups of deflected electrons beyond said segregating means for extracting energy from the moving groups of electrons over a succession of regions in their paths.

19. In an electrical discharge device, means for producing a stream of electrons, means electrically coupled to said stream for variably deflecting it in response to electrical waves, means for converting the deflections of said stream into electrical oscillations comprising means for producing from said oscillations an alternating electric field directed and traveling along the path of the deflected electrons and with which the moving deflected electrons interact to deliver energy thereto, the strength of said directed electric field varying in magnitude continuously from one side transversely across said path to the other side in the direction of the deflections, said field producing means including a helix of conducting material located along the path of the deflected stream and disposed to permit deflected electrons of the stream to pass axially therethrough, the turns of said helix being spaced apart in the direction of the axis of the stream substantially one half wave length of the normal operating frequency of the device, and a connection from said helix to a utilization circuit.

20. In an electrical discharge device, means including a cathode for producing a stream of electrons, electrode means for projecting said stream of electrons along a path at a given moderate velocity, means electrically coupled to said stream for variably deflecting it in response to electrical oscillations, means for converting the deflections of said stream into electrical oscillations comprising a helix of conducting material located along the path of the deflected stream and disposed to permit deflected electrons of the stream to pass axially therethrough, means to maintain said helix at a higher positive potential with respect to the cathode than said electrode means for projecting said stream of electrons at moderate velocity, and a connection from said helix to a utilization circuit.

21. An electronic device comprising a cathode, an accelerating electrode, and a source of potential connected therebetween for producing a stream of electrons along a path, means for propagating a high frequency electromagnetic wave along a path adjacent to said electron stream path for a distance of several wavelengths of said wave at substantially free space velocity and with the electric field of said wave substantially transverse across said electron stream path, means for moving said stream of electrons along said stream path in the region of said electric field at a velocity substantially less than one half said velocity of the electromagnetic wave comprising a pair of electrodes spaced apart along said electron stream and oppositely disposed longitudinally with respect to said electric field region, and a source of potential connected between each of said pair of electrodes and said accelerating electrode for maintaining said pair of electrodes at such a positive potential with respect to said cathode as will impart said electron stream velocity to said electron stream.

22. A device according to claim 21 including also a helix of conducting material located along said electron stream path beyond said pair of electrodes and disposed to permit electrons of the stream to pass axially therethrough.

23. An electronic device comprising means for producing a stream of electrons along a path, a high frequency wave transmission circuit located along the path of said stream of electrons and electrically coupled thereto capable of impressing a high frequency electric field across said path in a generally perpendicular direction thereto and thereby deflecting said stream of electrons, and means for extracting energy from the moving electrons in the deflected stream over a succession of regions greater than two along their paths comprising means for producing from said energy an alternating electric field, with which the moving deflected electrons may interact to deliver energy thereto, directed and traveling along the path of the deflected electrons, the strength of which said electric field varies in magnitude continuously transversely across said path of the deflected electrons, said field producing means including a plurality of circuit elements greater than two spaced along the path of the deflected stream of electrons beyond said deflecting means and electrically coupled to that path, said circuit elements being spaced apart in the direction of the axis of the stream substantially one half wave length of the normal operating frequency of the device and being electrically coupled to an output circuit in a manner to combine cumulatively therein the energy extracted from the electrons by said elements in said regions.

RAYMOND A. HEISING.

References Cited in the file of this patent

UNITED STATES PATENTS

| Number | Name | Date |
|---|---|---|
| 2,064,469 | Haeff | Dec. 15, 1936 |
| 2,096,460 | Llewellyn | Oct. 19, 1937 |
| 2,122,538 | Potter | July 5, 1938 |
| 2,233,126 | Haeff | Feb. 25, 1941 |
| 2,241,976 | Blewett et al. | May 13, 1941 |
| 2,289,756 | Clavier et al. | July 14, 1942 |
| 2,300,052 | Lindenblad | Oct. 27, 1942 |
| 2,367,295 | Llewellyn | Jan. 16, 1945 |
| 2,409,992 | Strobel | Oct. 22, 1946 |